(12) United States Patent
Kruithof et al.

(10) Patent No.: US 7,846,997 B2
(45) Date of Patent: Dec. 7, 2010

(54) PIGMENT PREPARATION

(75) Inventors: Klaas Jan Hendrik Kruithof, Leiden (NL); Rienk Hettema, Sassenheim (NL); Roger MacLiver Roy, Leiden (NL); Hendrik Meijer, Hazerswoudedorp (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 177 days.

(21) Appl. No.: 12/089,364

(22) PCT Filed: Oct. 3, 2006

(86) PCT No.: PCT/EP2006/066984

§ 371 (c)(1), (2), (4) Date: Apr. 4, 2008

(87) PCT Pub. No.: WO2007/039602

PCT Pub. Date: Apr. 12, 2007

(65) Prior Publication Data

US 2008/0269403 A1    Oct. 30, 2008

Related U.S. Application Data

(60) Provisional application No. 60/749,042, filed on Dec. 12, 2005.

(30) Foreign Application Priority Data

Oct. 4, 2005    (EP) .................. 05109204

(51) Int. Cl.
    *C08J 3/22*    (2006.01)
(52) U.S. Cl. .................... 523/351; 430/109.4; 524/599; 106/499
(58) Field of Classification Search .......... 106/499; 523/351; 524/599; 430/109.4
See application file for complete search history.

(56) References Cited

U.S. PATENT DOCUMENTS 6,344,500 B1 *    2/2002    Ogawa et al. ............... 523/407

FOREIGN PATENT DOCUMENTS

| DE | 102 45 623 | 4/2004 |
|----|------------|--------|
| EP | 0 256 454 | 2/1988 |
| EP | 0 902 061 | 3/1999 |
| EP | 1 026 178 | 8/2000 |
| EP | 1 493 782 | 1/2005 |
| WO | WO 95/07951 | 3/1995 |
| WO | WO 9507951 A1 * | 3/1995 |
| WO | WO 96/14347 | 5/1996 |
| WO | WO 99/05225 | 2/1999 |
| WO | WO 01/10923 | 2/2001 |
| WO | WO 01/92421 | 12/2001 |
| WO | WO 02/072639 | 9/2002 |
| WO | WO 03/064540 | 8/2003 |

OTHER PUBLICATIONS

Database WPI, Section Ch, Week 199327, Derwent Publications Ltd., JP 05 140499; Jun. 8, 1993.
Database WPI, Section Ch, Week 200509, Derwent Publications Ltd., JP 2004 339367, Dec. 2, 2004.
Search Report, European Application No. EP 05 10 9204, dated May 15, 2006.
International Search Report, International Application No. PCT/EP2006/066984, mailed Apr. 20, 2007.

* cited by examiner

*Primary Examiner*—Satya B Sastri
(74) *Attorney, Agent, or Firm*—Kenyon & Kenyon LLP

(57) ABSTRACT

The invention relates to a solid pigment preparation comprising at least 35% by weight of one or more pigments and at most 65% by weight of a dispersant resin, wherein the dispersant resin comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000.

20 Claims, No Drawings

PIGMENT PREPARATION

REFERENCE TO RELATED APPLICATION

This application is the U.S. National Phase of PCT/EP2006/066984 filed on Oct. 3, 2006 and claims the benefit of U.S. Provisional Application No. 60/749,042 filed on Dec. 12, 2005.

The invention relates to a solid pigment preparation comprising a pigment and a dispersant resin, to processes for preparing a pigment preparation and a coating composition, and to the use of a dispersant resin.

International patent application WO 03064540 describes granular pigments with an average particle size of 50 to 5,000 pm essentially comprising at least one pigment and at least one non-ionic surface-active additive based on polyethers. The non-ionic surface-active additive may be a pure polyalkylene oxide, such as polyethylene oxide or polypropylene oxide. Particularly suitable are alkylene oxide based block copolymers obtainable by polyaddition of alkylene oxides to aliphatic or aromatic alcohols or amines. The pigment preparations are described as being suitable as stir-in pigments. Stir-in pigment preparations are dry, generally powdery pigment concentrates comprising a pigment and a dispersing agent and can be incorporated into a matrix, such as a coating composition, by simple stirring without the need of an additional dispersing step, hence the name stir-in pigment preparation.

Although the known pigment preparations can be satisfactorily used in applications having lower requirements with respect to colour strength and colour accuracy, some properties of the known pigment preparations are insufficient for, e.g., paints for refinishing of vehicles. More particularly, when difficult-to-disperse high-transparency pigments are used, the paint properties require improvement. The compatibility with different let-down binder systems is not always optimal either.

Accordingly, the invention seeks to provide a pigment preparation comprising a pigment and a dispersant resin which can be used as a stir-in pigment preparation, leading to a paint containing stable, well dispersed pigments. The pigment preparation should be easy to incorporate into coating compositions in which the pigments are stably dispersed. In addition, it should be possible to prepare the pigment preparation with a wide range of pigments. The pigment preparation should allow the preparation of paint having excellent properties and stability, especially in the case of difficult-to-disperse-and-stabilize pigments. The pigment preparation should be compatible with a wide variety of different let-down binder systems.

The invention now provides a solid pigment preparation comprising a pigment and a dispersant resin, wherein the composition comprises at least 35% by weight of at least one pigment and at most 65% by weight of dispersant resin, calculated on the combined weight of pigment and dispersant resin, and wherein the dispersant resin comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000.

It should be noted that international patent application WO 9507951 describes aqueous coating compositions wherein an amphiphatic emulsifier is used to emulsify generally lipophilic, crosslinkable binders without the need for significant amounts of organic co-solvents. The amphiphatic emulsifier comprises a polyester backbone having pendent hydrophilic polyalkylene oxide monoalkylether groups.

The pigment preparation of the invention can be used as a stir-in pigment preparation, leading to a coating composition containing stable, well dispersed pigments. The pigment preparation can be easily incorporated into coating compositions in which the pigments are stably dispersed. In addition, it is possible to prepare the pigment preparation with a wide range of pigments. The pigment preparation allows the preparation of paint having excellent properties and stability, especially in the case of difficult-to-disperse-and-stabilize pigments. Furthermore, the pigment preparation is compatible with a wide variety of different letdown binder systems.

The pigment preparation of the invention may comprise an inorganic or an organic pigment. Alternatively, the pigment preparation may comprise a plurality of different pigments, for example two or more inorganic pigments, two or more organic pigments, or a mixture of one or more inorganic pigments and one or more organic pigments.

The pigment particles within the preparation are generally present in finely divided form. Accordingly, the pigments typically have average particle sizes within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm.

The average particle size of the pigment particles within the preparation can for example be determined by electron microscopy. Since the average particle size of the pigments within the preparation is essentially the same as the average particle size of the pigments after they are stirred into a liquid, it is also possible to mix the pigment preparation with a liquid medium and to determine the average pigment particle size by dynamic light scattering.

The organic pigments are typically organic chromatic and black pigments. Inorganic pigments can likewise be colour pigments (chromatic, black, and white pigments) and also luster pigments and the inorganic pigments typically used as fillers.

The following are examples of suitable organic colour pigments:

monoazo pigments:
  C.I. Pigment Brown 25; C.I. Pigment Orange 5, 13, 36, 38, 64 and 67; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112,146,148, 170, 175, 184, 185, 187, 191:1, 208, 210, 245, 247 and 251; C.I. Pigment Yellow 1, 3, 62, 65, 73, 74, 97, 120, 151, 154, 168, 181, 183, and 191; C.I. Pigment Violet 32;

diazo pigments:
  C.I. Pigment Orange 16, 34, 44, and 72; C.I. Pigment Yellow 12, 13, 14, 16, 17, 81, 83,106, 113, 126, 127, 155, 174, 176, 180, and 188;

diazo condensation pigments:
  C.I. Pigment Yellow 93, 95 and 128; C.I. Pigment Red 144, 166, 214, 220, 221, 242, and 262; C.I. Pigment Brown 23 and 41;

anthanthrone pigments:
  C.I. Pigment Red 168;

anthraquinone pigments:
  C.I. Pigment Yellow 147, 177, and 199; C.I. Pigment Violet 31;

anthrapyrimidine pigments:
  C.I. Pigment Yellow 108;

quinacridone pigments:
  Pigment Orange 48 and 49; C.I. Pigment Red 122, 202, 206, and 209; C.I. Pigment Violet 19;

quinophthalone pigments:
  C.I. Pigment Yellow 138;
diketopyrrolopyrrole pigments:
  C.I. Pigment Orange 71, 73 and 81; C.I. Pigment Red 254, 255, 264, 270, and 272;
dioxazine pigments:
  C.I. Pigment Violet 23 and 37; C.I. Pigment Blue 80;
flavanthrone pigments:
  C.I. Pigment Yellow 24;
indanthrone pigments:
  C.I. Pigment Blue 60 and 64;
isoindoline pigments:
  C.I. Pigments Orange 61 and 69; C.I. Pigment Red 260; C.I. Pigment Yellow 139 and 185;
isoindolinone pigments:
  C.I. Pigment Yellow 109, 110, and 173;
isoviolanthrone pigments:
  C.I. Pigment Violet 31;
metal complex pigments:
  C.I. Pigment Red 257; C.I. Pigment Yellow 117, 129, 150, 153, and 177; C.I. Pigment Green 8;
perinone pigments:
  C.I. Pigment Orange 43; C.I. Pigment Red 194;
perylene pigments:
  C.I. Pigment Black 31 and 32; C.I. Pigment Red 123, 149, 178, 179, 190, and 224; C.I. Pigment Violet 29;
phthalocyanine pigments:
  C.I. Pigment Blue 15, 15:1, 15:2, 15:3, 15:4, 15:6, and 16; C.I. Pigment Green 7 and 36;
pyranthrone pigments:
  C.I. Pigment Orange 51; C.I. Pigment Red 216;
pyrazoloquinazolone pigments:
  C.I. Pigment Orange 67; C.I. Pigment Red 251;
thioindigo pigments:
  C.I. Pigment Red 88 and 181; C.I. Pigment Violet 38;
triarylcarbonium pigments:
  C.I. Pigment Blue 1, 61 and 62; C.I. Pigment Green 1; C.I. Pigment Red 81, 81:1 and 169; C.I. Pigment Violet 1, 2, 3, and 27; C.I. Pigment Black 1 (aniline black); C.I. Pigment Yellow 101 (aldazine yellow); C.I. Pigment Brown 22.

Examples of suitable inorganic colour pigments are:
white pigments:
  titanium dioxide (C.I. Pigment White 6), zinc white, pigment grade zinc oxide; zinc sulfide, lithopone;
black pigments:
  iron oxide black (C.I. Pigment Black 11), iron manganese black, spinel black (C.I. Pigment Black 27); carbon black (C.I. Pigment Black 7);
chromatic pigments:
  chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet; manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminium oxide, aluminium hydroxide, natural micas, natural and precipitated chalk, and barium sulfate.

Luster pigments are platelet-shaped pigments having a monophasic or polyphasic construction the colour play of which is marked by the interplay of interference, reflection, and absorption phenomena. Examples are aluminium platelets and aluminium, iron oxide, and mica platelets bearing one or more coats, especially of metal oxides.

As mentioned above, the pigment preparation of the invention comprises as essential ingredients a pigment and a dispersant resin, wherein the composition comprises at least 35% by weight of at least one pigment and at most 65% by weight of dispersant resin, calculated on the combined weight of pigment and dispersant resin. When the pigment in the preparation is carbon black, it is preferred that the content of carbon black in the pigment preparation is in the lower part of the described range. Thus, when the pigment is carbon black, the pigment preparation preferably comprises at least 40% by weight, more preferably at least 45% by weight of carbon black, and at most 60% by weight, preferably at most 55% by weight of dispersant resin, calculated on the combined weight of pigment and dispersant resin. With other pigments, the pigment preparation generally comprises at least 60% by weight preferably at least 64% by weight, more preferably at least 68% by weight, and most preferably at least 70% by weight of at least one pigment, and at most 40% by weight, preferably at most 36% by weight, more preferably at most 32% by weight, and most preferably at most 30% by weight of dispersant resin, calculated on the combined weight of pigment and dispersant resin. In a particularly preferred embodiment, the above-mentioned weight ratios of pigment and dispersant resin also apply when calculated on the total weight of the pigment preparation.

The pigment preparation may further comprise other ingredients, additives or auxiliaries commonly used in pigment preparations, such as organic solvents, wetting agents, antifoaming agents, heat stabilizers, light stabilizers, antioxidants, and other pigment dispersion aids and/or surfactants.

In one embodiment, the pigment preparation of the invention is a free-flowing powder which is suitable for use as a stir-in pigment. Also solid compacted pigment preparations can be used, for example in the form of pellets or tablets.

The polyester backbone of the pigment dispersant resin to be used in the pigment preparation and process according to the invention can be prepared according to generally known esterification reactions of building blocks having ester-forming functional groups. Examples of ester-forming functional groups are carboxylic acid groups, (cyclic) carboxylic anhydride groups, carboxylic ester groups, hydroxy groups, epoxide groups, oxetane groups, and lactone groups. In order to form a polyester, at least a part of the building blocks used must have a functionality of at least 2. However, mono-functional and tri- or higher functional building blocks can be used as well.

Examples of suitable building blocks are dicarboxylic acids such as sebacic acid, dodecanedioic acid, octenyl succinic acid, dodecenyl succinic acid (any isomer or mixture of isomers), as well as dimer fatty acids. Examples of carboxylic anhydrides are decanoic anhydride, dodecanoic anhydride, dodecyl succinic anhydride, and dodecenyl succinic anhydride.

Hydroxycarboxylic acids and lactones derived therefrom, such as gamma-decanolactone, can also be used.

Examples of cycloaliphatic polyols include 1,4-cyclohexane dimethanol, 1,4-cyclohexane diol, 2,2-bis(4-hydroxycyclohexyl)propane, bis-hydroxymethyltricyclo-decane, and mixtures thereof. Examples of aliphatic polyols include glycerol, 1,2-propane diol, 1,3-propane diol, 2-methyl-1,3-propane diol, neopentyl glycol, 1,6-hexane diol, trimethylol ethane, trimethylol propane, 1,2,6-hexane triol, pentaerythritol, ditrimethylol propane, propoxylated pentaerythritol, ethoxylated trimethylol propane, dimethylol propionic acid, and mixtures thereof.

Preferred diols include 1,2-ethane diol, 1,2-propane diol, 1,3-propane dial, 3-methyl-1,3-propane diol, 2-butyl-2-ethyl-1,3-propane dial, dimethylol propionic acid, and 1,4cyclohexane dimethanol.

Suitable cyclic polycarboxylic acids include aromatic polycarboxylic acids and cycloaliphatic polycarboxylic acids. Examples of aromatic polycarboxylic acids include isophthalic acid, phthalic acid, trimellitic acid, and mixtures thereof. Also included are the esters or the anhydrides thereof, such as phthalic anhydride, trimellitic anhydride, and mixtures thereof. Examples of cycloaliphatic poly-carboxylic acids include 1,2-cyclohexane dicarboxylic acid, 1,3-cyclohexane dicarboxylic acid, tetrahydrophthalic acid, endomethylene tetrahydrophthalic acid, hexahydrophthalic acid, methyl hexahydrophthalic acid, and mixtures thereof. Also included are the esters or the anhydrides thereof, such as tetrahydrophthalic anhydride, endomethylene tetrahydrophthalic anhydride, hexahydrophthalic anhydride, methyl hexahydrophthalic anhydride, and mixtures thereof.

Examples of acyclic polycarboxylic acids include malonic acid, succinic acid, glutaric acid, adipic acid, azelaic acid, and mixtures thereof. Also included are the esters or the anhydrides thereof, such as the dimethyl ester and the diethyl ester of malonic acid, succinic anhydride, and mixtures thereof.

It is to be understood that the at least one pendent hydrophilic polyalkylene oxide monoalkylether group is generally linked to the polyester backbone via a covalent bond. The at least one pendent hydrophilic polyalkylene oxide monoalkylether group can be introduced by using building blocks having ester-forming functional groups and at least one pending polyalkylene oxide monoalkylether group in the esterification reaction. Examples of compounds having two ester-forming functional groups and a pendent hydrophilic polyalkylene oxide based group are derived from triols wherein one hydroxyl group is blocked with a polypropylene or polyethylene oxide based segment terminated with an ether group. A commercially available example of such a diol is Tegomer D 3403 ex Tego Chemie Service GmbH, Germany.

Alternatively, it is possible to introduce the at least one pendent hydrophilic polyalkylene oxide monoalkylether group in a post-polymerization reaction, i.e. to first prepare the polyester backbone and subsequently graft the at least one pendent hydrophilic polyalkylene oxide monoalkylether group to the backbone.

For this latter route it is particularly suitable to prepare the pigment dispersant resin by the addition reaction of (i) a hydrophilic polyalkylene oxide monoamine monoalkylether of the formula

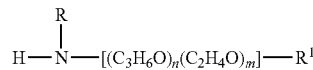

(I)

wherein R is the residue of a monoepoxide compound after reaction with an amine group, $R^1$ is selected from $C_1$ to $C_4$ alkyl groups, n is 0 to 25, m is 1 to 50, with the proviso that n+m≦50, and (ii) a polyester backbone having electron depleted carbon—carbon double bonds.

It is preferred that R in formula (I) is the residue of a monoepoxide compound having from 1 to 20 carbon atoms after reaction with an amine group, $R^1$ is a methyl group, n is 2 to 4, and m is 16 to 20. It is particularly preferred that R is the residue of a monoepoxide compound of the general formula (II)

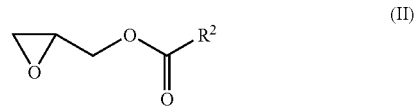

(II)

wherein $R^2$ is an alkyl group with 4 to 10 carbon atoms, after reaction with an amine group.

Examples of suitable monoepoxide starting materials for the preparation of compounds according to formula (I) are epoxidized olefins, such as epoxidized α-olefins; glycidyl ethers of monohydroxy compounds, such as ethylhexyl glycidyl ether, butyl glycidyl ether, hexyl glycidyl ether, phenyl glycidyl ether; and glycidyl esters of carboxylic acids, such as propionic acid glycidyl ester, hexanoic acid glycidyl ester, ethylhexanoic glycidyl ester, decanoic glycidyl ester, and versatic acid glycidyl ester, commercially available from Hexion under the name Cardura® E 10.

Examples of suitable amine starting materials for the preparation of compounds according to formula (I) or (II) are polyalkylene oxide based amines, which are commercially available from Huntsman under the trade designation Jeffamine® M.

The polyester backbone having electron-depleted carbon—carbon double bonds can be prepared as described above from building blocks having ester-forming functional groups. Electron-depleted carbon—carbon double bonds can be introduced by using building blocks having ester-forming functional groups and at least one electron-depleted carbon—carbon double bond in the esterification reaction. Examples of compounds having ester-forming functional groups and an electron-depleted carbon—carbon double bond are maleic acid, maleic anhydride, fumaric acid, itaconic acid, itaconic anhydride, citraconic acid, citraconic anhydride, as well as acrylic acid and methacrylic acid and ester-forming derivatives thereof. Building blocks having two ester-forming functional groups and at least one electron-depleted carbon—carbon double bond are preferred. The most preferred building block having two ester-forming functional groups and at least one electron-depleted carbon—carbon double bond is maleic anhydride.

The polyester backbone having electron-depleted carbon—carbon double bonds can be prepared in a single-stage reaction or in two or more reaction stages. The number average molecular weight of the polyester backbone generally is in the range of 500 to 120,000. Preferably, the number average molecular weight of the polyester backbone is below 80,000, more preferably below 40,000, and most preferably below 20,000.

The pigment dispersant resin suitably has a low acid value; preferably, the acid value of the pigment dispersant resin does not exceed 5 mg KOH/g, calculated on non-volatile matter of the dispersant resin.

As mentioned above, the number average molecular weight of the pigment dispersant resin is in the range of 1,000 to 150,000. Preferably, the number average molecular weight does not exceed 50,000.

The pigment dispersant resin optionally comprises other functional groups, for example hydroxy groups. It is preferred that the hydroxyl value of the dispersant resin is in the range of 10 to 300 mg KOH/g, calculated on non-volatile matter of the dispersant resin.

Further, the pigment dispersant resin optionally comprises carbon—carbon double bonds (C═C bonds), for example when only a part of the unsaturation of the polyester backbone has been reacted with a hydrophilic polyalkylene oxide monoamine monoalkylether. Preferably, the C═C equivalent weight of the dispersant resin is in the range of 100 to 50,000 g/equivalent.

As mentioned above, the dispersant resin comprises at least one pendent hydrophilic polyalkylene oxide based side group per molecule. It is preferred that the dispersant resin comprises at least two, more preferably at least three pendent hydrophilic polyalkylene oxide based side groups per molecule. In a typical embodiment, the polyester backbone of the dispersant resin is essentially linear and preferably lipophilic, having pendent hydrophilic polyalkylene oxide side groups. Such polymers may also be described as comb polymers.

Examples of suitable alkylene oxides are ethylene oxide, propylene oxide, and butylene oxide. It is preferred that the polyalkylene oxide based side groups are based on ethylene oxide or propylene oxide or mixtures thereof. So far very good results have been obtained with polyalkylene oxide based side groups at least 50% by weight, preferably 70% by weight of which is based on ethylene oxide, calculated on the total weight of the polyalkylene oxide based side group.

As mentioned above, the dispersant resin which comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000, can be used for the preparation of a stir-in pigment preparation.

The invention further relates to a process for preparing a pigment preparation comprising the steps of
a) stirring a pigment and a dispersant resin, optionally with added water or organic diluent, to form a fluidized pigment slurry,
b) optionally, milling the slurry, and
c) drying the slurry, wherein the dispersant resin comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000.

As mentioned above in respect of the pigment preparation, the pigment used in the process can be an organic or an inorganic pigment. It is also possible to use a mixture of pigments, for example a mixture of two or more inorganic pigments, a mixture of two or more organic pigments, or a mixture of inorganic and organic pigments. It is possible to use a large variety of pigments in the process. The pigments can be introduced into the process as standard dried powdery pigments. The milling step serves to break up agglomerates and to achieve the required pigment particle size. Organic pigments are also available as so-called press cakes. Organic pigments, when synthesized, are in the form of very small crystals, called primary particles. The aim of pigment synthesis is to produce primary particles of a size that optimizes pigment application properties such as colour strength, tone and brightness, flow properties, and transparency or opacity. The press cake contains the pigment essentially in this disaggregated form. Hence, less energy is required to break up agglomerates and to achieve the required pigment particle size. During drying of the pigment press cake in the absence of dispersant resin, primary particles will join together to form aggregates and agglomerates. Therefore, when an organic pigment is used in the process, it is possible and preferred to use the organic pigment in the form of a pigment press cake. When pigment press cakes are used, simple stirring of the fluidized pigment slurry may be sufficient to achieve the required pigment particle size. Milling of the slurry may be redundant in such cases.

When additional liquid is required to fluidize the mixture of pigment and dispersant resin, it is preferred that the liquid is water. Instead of water or in addition to water organic solvents may be used, such as glycols or glycol ethers, for example ethylene glycol or higher homologues thereof or ethylene glycol mono-n-butyl ether.

The optional milling step can be carried out using well-known milling equipment usually employed for breaking down the particle size of pigments. Examples of suitable equipment for carrying out the process are bead mills, jet mills, ultrasonic mills, basket mills, roll mills, and high-speed dissolvers. Milling is generally continued until the average particle size is within the range of 50 nm to 5,000 nm. Preferably, the average particle size is at least 80 nm, more preferably at least 100 nm. It is preferable that the average particle size is at most 3,000 nm, more preferably at most 1,500 nm, and most preferably at most 1,000 nm.

Examples of suitable methods of drying are spray granulation and fluidized bed drying, spray-drying, drying in a paddle dryer, evaporation and subsequent comminution, and freeze-drying. The selected method of drying may influence the particle size of the pigment preparations of the present invention. The drying step is preferably carried out by freeze-drying or by spray-drying.

Spray and fluidized bed granulation may produce coarsely divided granules having average particle sizes from 50 to 5,000 µm and especially from 100 to 1,000 µm. Depending on the process conditions, spray-drying may also produce finely divided pigment preparations. Spray-drying may for example produces granules having average particle sizes<20 µm. Finely divided preparations are also obtainable by drying in a paddle dryer and by evaporation with subsequent grinding.

The residual moisture content of the dried solid pigment preparation obtained can vary significantly. The residual moisture content may for example be 15% by weight, calculated on the weight of the total pigment preparation. Generally, the residual moisture content does not exceed 15% by weight, preferably it does not exceed 12% by weight. In many cases, the residual moisture content is even less than 5% by weight. When the pigment preparation is intended for use in non-aqueous systems, a low residual moisture content is particularly preferred, for example less than 2% by weight.

In use, the pigment preparations of the present invention are notable for their excellent colour properties, especially with regard to colour strength, brilliance, hue and hiding power, and especially for their stir-in characteristics, i.e. they can be dispersed in application media with a minimal input of energy, simply by stirring or shaking.

The pigment preparations of the present invention additionally have the following advantages: they have a high pigment content, exhibit very good stability in storage, are both economically and ecologically advantageous with regard to packaging, storage, and transportation, and they are more flexible in use.

The pigment preparations of the present invention are very useful for pigmenting macromolecular organic and inorganic materials of any kind. Liquid application media in this context can be purely aqueous, comprise mixtures of water and organic solvents, for example alcohols, or be based exclusively on organic solvents, such as alcohols, glycol ethers, ketones, e.g. methylethyl ketone, amides, e.g. N-methyl pyrrolidone and dimethyl formamide, esters, e.g. ethyl acetate, butyl acetate, and methoxypropyl acetate, or aromatic or aliphatic hydrocarbons, e.g. xylene, mineral oil, and mineral spirits. It is preferred to use the pigment preparation of the invention for pigmenting water borne coating compositions.

Examples of materials which can be pigmented with the pigment preparations of the present invention include: coatings, for example architectural coatings, industrial coatings, automotive coatings, radiation-curable coatings, powder coatings; paints, including paints for building exteriors and building interiors, for example wood paints, lime washes, distempers, emulsion paints; solvent borne printing inks, for example offset printing inks, flexographic printing inks, toluene intaglio printing inks, textile printing inks, radiation-curable printing inks; water borne inks, including inkjet inks; colour filters; building materials (water is typically added only after the building material and the pigment preparation have been dry-mixed), for example silicate render systems, cement, concrete, mortar, gipsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; plastics; and detergents.

The pigment preparations of the present invention are particularly useful as mixing components in colour-mixing or -matching systems. Owing to their stir-in characteristics, they can be used directly as a solid for this purpose. If desired, however, they may also be first converted into base colors, mixing varnishes, and tinting colours (especially into colours having a high solids content, "HS colours"), or even more highly pigmented tinting pastes, which then constitute the components of the mixing system. The matching of the desired hue and hence the mixing of the colour components can be effected visually via a system of colour cards in a very large number of hue gradations based on colour standards, such as RAL, BS, and NCS, or preferably under computer control, whereby an unlimited number of hues become accessible ("computer colour matching"). A process for preparing a pigmented coating composition comprises mixing with stirring, in any workable order, the pigment preparation of the present invention, at least one film-forming binder, and at least one liquid diluent.

EXAMPLES

| | Raw materials used: |
|---|---|
| Jeffamine M 1000 | Polyalkylene oxide based amine ex Huntsman |
| Cardura E10 | Glycidyl ester of versatic acid ex Hexion |
| Ionol CP | Butylated hydroxy toluene, an antioxidant ex Degussa |
| Colour Black FW200 | Black pigment ex Degussa |
| Surfynol CT 141 | Dispersion aid ex Air Products |
| Autowave | Water borne modular base coat system ex Akzo Nobel Car Refinishes |

-continued

| | Raw materials used: |
|---|---|
| Autowave 665 | Clear base module of Autowave comprising a blend of polyurethane and acrylic resin dispersions ex Akzo Nobel Car Refinishes |

General Methods

The gloss was determined with a Byk-Gardner gloss meter and the results are reported in gloss units.

The colour was measured using a spectrophotometer and L*a*b* values according to the CIE Lab system.

Example 1

Preparation of a Dispersant Resin

Preparation of a Polyester Backbone Having Electron-Depleted Carbon-Carbon Double Bonds In a reaction vessel fitted with a stirrer, a thermocouple, a heating jacket, a packed column, and a distillation head were placed 164.6 g of 1,4-dimethylol cyclohexane, 82.8 g of 1,4-cyclohexane dicarboxylic acid, 65.0 g of maleic anhydride, and 1.0 g of Ionol CP. The mixture was heated to 200° C. under a stream of nitrogen until an acid number of 32 to 38 mg KOH/g was reached. The temperature was then lowered to 180° C. and 171.0 g of Cardura E10 were added. The reaction mixture was kept at 180° C. until the acid number was below 1 mg KOH/g. Subsequently the mixture was cooled to 150° C. and 514.4 g of Jeffamine M 1000 were added. The mixture was kept at 150° for 2 more hours and subsequently cooled to room temperature. The final dispersant resin had a polyethylene oxide content of 53% by weight and was soluble in water. The theoretical number average molecular weight was 5,286.

Example 2

Preparation of a Pigment Preparation

A mixture of 59.00 parts by weight of water, 12.50 parts by weight of a 20% by weight aqueous solution of dimethyl ethanolamine, 0.06 parts by weight of propylene glycol, 10.44 parts by weight of a 84% by weight aqueous solution of the dispersant resin of Example 1, 0.50 parts by weight of an antifoaming agent, 7.50 parts by weight of Surfynol CT 141, and 10.00 parts by weight of Color Black FW200 were bead-milled using a total of 12 passes plus 2 hours of circulation. The fineness of grind of the paste was below 5 microns on a Hegman gauge.

Samples were dried using a Drytec compact laboratory spray-drier operating at an atomizer pressure of 2.5 bar. The inlet temperature was 140° C., the outlet temperature 60° C. The finished powdery pigment preparation had a residual moisture content of 10% by weight.

Examples 3 and 4 and Comparative Examples A and B

Preparation of Coating Compositions

The pigment preparation of Example 2 was tested as stir-in pigment in a water borne binder system Autowave 665 (Example 3). An IKA RW20 stirrer with 4 cm stirrer blade operating at 750-760 rpm was used for the tests. The pigment preparation of Example 2 was added, under stirring, to the clear binder Autowave 665. Sufficient pigment preparation was added to give a coating composition having a pigment to binder ratio of 0.162. The mixture was stirred at the set speed for a total of 60 minutes. The liquid coating composition was then transferred to a Silverson L2 air mixer operating at 3.5 bar and subjected to a further 60 minutes of stirring.

Comparative coating composition A was prepared by mixing the same binder system Autowave 665 with the liquid pigment preparation of Example 2 before drying. The same pigment to binder ratio of 0.162 was used as in Example 3.

The finished coating composition of Example 3 had excellent fineness of grind and no particles were apparent in a Hegman gauge test. The compositions of Example 3 and comparative Example A were applied on Leneta Form 2A opacity cards using a K-Control Coater (Bar 0.7, Speed 3) and left to dry at room temperature overnight.

The properties of Example 3 and comparative Example A are summarized in Table 1 below:

TABLE 1

| Example | Gloss 20° | Gloss 60° | fineness |
| --- | --- | --- | --- |
| 3 | 63 | 83 | below 10 μm |
| A | 51 | 79 | below 10 μm |

The gloss of Example 3 according to the invention is higher than the gloss of Comparative Example A.

White reductions were prepared by mixing the coating compositions with white toners:

Example 4

The coating composition of Example 3 was mixed with white toner module Autowave 099 so that the weight ratio of black pigment to white pigment in the resulting mixture was 10:90.

Comparative Example B

The coating composition of Comparative Example A was mixed with white toner module Autowave 099 so that the weight ratio of black pigment to white pigment in the resulting mixture was 10:90.

The coating compositions of Example 4 and Comparative Example B were applied to opacity cards as described above. The L*a*b* values of the dried samples are given in Table 2 below:

TABLE 2

| Example | L* | a* | b* |
| --- | --- | --- | --- |
| 4 | 29.14 | −0.80 | −3.98 |
| B | 31.78 | −0.89 | −4.77 |

The L*-value for the 10% white reduction mixture of Example 4 is lower than the L*-value of Comparative Example C, indicating more tinting strength for the stir-in pigment.

The results demonstrate that it is possible to make coating compositions from the dried stir-in pigment preparation according to the invention having the same or even better properties than the comparative examples.

Example 5

Preparation of a Pigment Preparation

A mixture of 31.16 parts by weight of water, 0.58 parts by weight of dimethyl ethanolamine, 1.75 parts by weight of propylene glycol, 7.8 parts by weight of a 90% by weight aqueous solution of the dispersant resin of Example 1, 0.58 parts by weight of an antifoaming agent, 5.81 parts by weight of Surfynol CT 141, and 52.32 parts by weight of Novoperm Orange HL70 pigment ex Clariant were bead-milled using a total of 8 passes plus 2 hours of circulation. The fineness of grind of the liquid paste was below 5 microns on a Hegman gauge.

A sample of the liquid paste preparation was freeze-dried using commercial freeze-drying equipment. The finished powdery pigment preparation had a residual moisture content of less than 10% by weight.

Example 6

Preparation of a Pigment Preparation

A mixture of 41.3 parts by weight of water, 0.5 parts by weight of dimethyl ethanolamine, 1.5 parts by weight of propylene glycol, 10 parts by weight of a 90% by weight aqueous solution of the dispersant resin of Example 1, 0.5 parts by weight of an antifoaming agent, 0.2 parts by weight of Disperbyk 181, a dispersant ex Byk Chemie, and 46 parts by weight of Irgazin DPP red BO pigment ex Ciba were bead-milled using a total of 10 passes plus 2 hours of circulation. The fineness of grind of the liquid paste was below 5 microns on a Hegman gauge. A sample of the liquid paste preparation was freeze-dried using commercial freeze-drying equipment. The finished powdery pigment preparation had a residual moisture content of less than 10% by weight.

Examples 7 and 8 and Comparative Examples C and D

A clear base was prepared by mixing 27.21 parts by weight of an aqueous polyurethane dispersion, 26.8 parts by weight of an aqueous polyacrylate/-polyurethane hybrid dispersion, 0.8 parts by weight of a 5% aqueous solution of N,N-dimethyl ethanolamine, 11.58 parts by weight of water, 6.04 parts by weight of butyl glycol, 22.68 parts by weight of a 2% aqueous clay dispersion, 4.23 parts by weight of a polyurethane thickener, and 0.66 parts by weight of a surfactant.

Example 7

A pigmented coating composition was prepared by mixing the following components for 30 minutes with an air mixer: 81.83 parts by weight of the above-described clear base, 6.86 parts by weight of water, and 11.31 parts by weight of the freeze-dried pigment preparation of Example 5.

Comparative Example C

A pigmented coating composition was prepared by mixing the following components for 10 minutes with an electric laboratory mixer: 81.5 parts by weight of the above-described clear base, 0.5 parts by weight of water, and 18.04 parts by weight of the liquid, non-freeze-dried pigment preparation (paste) of Example 5.

Example 8

A pigmented coating composition was prepared by mixing the following components for 30 minutes with an air mixer: 81.72 parts by weight of the above-described clear base, 6.85 parts by weight of water, and 11.43 parts by weight of the freeze-dried pigment preparation of Example 6.

Comparative Example D

A pigmented coating composition was prepared by mixing the following components for 10 minutes with an electric laboratory mixer: 80.3 parts by weight of the above-described clear base and 19.7 parts by weight of the liquid, non-freeze-dried pigment preparation (paste) of Example 6.

The final coating compositions of Examples 7 and 8 and Comparative Examples C and D, respectively, were identical regardless of the preparative route, i.e. direct from the original liquid paste or from the freeze-dried powder. The Hegman grind results were below 10 microns for all coating compositions, indicating excellent re-dispersability properties.

The compositions of Examples 7 and 8 and Comparative Examples C and D were applied on a transparent melinex sheet using a K-Control coater (Bar 4, Speed 3) and left to dry at room temperature overnight. The gloss and transparency measurements on the coatings are summarized in Table 3 below:

TABLE 3

| Example | Gloss 20° | Gloss 60° | Transparency |
|---|---|---|---|
| 7 | 15.2 | 61 | 10.7 |
| C | 3.1 | 38 | 8.3 |
| 8 | 36.5 | 78.2 | 39.6 |
| D | 20.7 | 70.2 | 36.4 |

The colour properties were determined on 50:50 white reductions with a water borne white toner module. The reductions were applied on Leneta Form 2A opacity cards using a K-Control Coater (Bar 0.7, Speed 3) and left to dry overnight at room temperature.

The colour properties are summarized in Table 4 below:

TABLE 4

| Ex. | L* | a* | b* | C*ab | hab | dL* | da* | db* | dC*ab | dHab | dEcmc |
|---|---|---|---|---|---|---|---|---|---|---|---|
| D | 44.4 | 60.03 | 24.82 | 64.96 | 22.46 | | | | | | |
| 8 | 45.06 | 59.20 | 23.37 | 63.65 | 21.54 | 0.66 | −0.83 | −1.45 | −1.31 | −1.03 | 0.88 |
| C | 57.88 | 43.38 | 38.52 | 58.01 | 41.60 | | | | | | |
| 7 | 58.85 | 42.23 | 39.42 | 57.77 | 43.03 | 0.98 | −1.15 | 0.90 | −0.24 | 1.44 | 1.29 |

The final film properties for paint derived from the stir-in pigment appeared excellent and did not differ substantially from those for the comparative examples employing the original pigment paste.

The invention claimed is:

1. A solid pigment preparation in the form of granules, powder, pellets or tablets, said preparation comprising a pigment and a dispersant resin, wherein the preparation comprises at least 35% by weight of the pigment and at most 65% by weight of the dispersant resin, calculated on the combined weight of pigment and dispersant resin, characterized in that the dispersant resin comprises a polyester backbone having at least one pendent hydrophilic alkylene oxide monoalkylether group, the dispersant resin comprising 30 to 80% by weight of alkylene oxide units and having a number average molecular weight of 1,000 to 150,000.

2. The pigment preparation according to claim 1, characterized in that the acid value of the dispersant resin does not exceed 5 mg KOH/g, calculated on non-volatile matter of the dispersant resin.

3. The pigment preparation according to claim 1, characterized in that the dispersant resin has a C=C equivalent weight in the range of 100 to 50,000 g/equivalent.

4. The pigment preparation according to claim 1, characterized in that the hydroxyl value of the dispersant resin is in the range of 10 to 300 mg KOH/g, calculated on non-volatile matter of the dispersant resin.

5. The pigment preparation according to claim 1, characterized in that the dispersant resin is obtained by the addition reaction of
   (i) a hydrophilic alkylene oxide monoamine monoalkylether of the formula

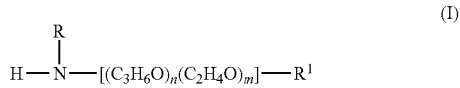

(I)

wherein R is the residue of a monoepoxide compound after reaction with an amine group, $R^1$ is selected from $C_1$ to $C_4$ alkyl groups, n is 0 to 25, m is 1 to 50, with the proviso that n+m≦50, and
   (ii) a polyester backbone having electron-depleted carbon-carbon double bonds.

6. The pigment preparation according to claim 5, characterized in that R is the residue of a monoepoxide compound having from 1 to 20 carbon atoms after reaction with an amine group, $R^1$ is a methyl group, n is 2 to 4, and m is 16 to 20.

7. The pigment preparation according to claim 6, characterized in that R is the residue of a monoepoxide compound of the general formula (II)

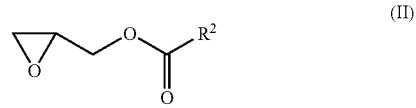

(II)

wherein $R^2$ is an alkyl group with 4 to 10 carbon atoms, after reaction with an amine group.

8. A process for preparing a pigment preparation in the form of granules, powder, pellets or tablets, comprising the steps of
   a) stirring a pigment and a dispersant resin to form a fluidized pigment slurry, and
   b) drying the slurry,
characterized in that the dispersant resin comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000.

9. The process according to claim 8, characterized in that the pigment is an organic pigment provided in the form of a press cake.

10. The process according to claim 8, characterized in that step b) is carried out by freeze-drying or spray-drying.

11. A process for preparing a pigmented coating composition comprising mixing with stirring in any workable order
   a) the pigment preparation according to claim 1,
   b) at least one film-forming binder, and
   c) at least one liquid diluent.

12. A method of preparing a stir-in pigment preparation, the method comprising adding a dispersant resin to the preparation, in the form of granules, powder, pellets or tablets, wherein the dispersant resin comprises a polyester backbone having at least one pendent hydrophilic polyalkylene oxide monoalkylether group, the dispersant resin comprising 30 to 80% by weight of alkylene oxide units and having a number average molecular weight of 1,000 to 150,000.

13. The pigment preparation according to claim 2, characterized in that the dispersant resin has a C=C equivalent weight in the range of 100 to 50,000 g/equivalent.

14. The pigment preparation according to claim 2, characterized in that the hydroxyl value of the dispersant resin is in the range of 10 to 300 mg KOH/g, calculated on non-volatile matter of the dispersant resin.

15. The pigment preparation according to claim 14, characterized in that the dispersant resin is obtained by the addition reaction of
   (i) a hydrophilic alkylene oxide monoamine monoalkylether of the formula

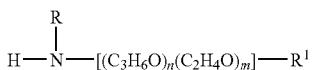

(I)

wherein R is the residue of a monoepoxide compound after reaction with an amine group, $R^1$ is selected from $C_1$ to $C_4$ alkyl groups, n is 0 to 25, m is 1 to 50, with the proviso that n+m≦50, and
   (ii) a polyester backbone having electron-depleted carbon-carbon double bonds.

16. The pigment preparation according to claim 15, characterized in that R is the residue of a monoepoxide compound having from 1 to 20 carbon atoms after reaction with an amine group, $R^1$ is a methyl group, n is 2 to 4, and m is 16 to 20.

17. The pigment preparation according to claim 16, characterized in that R is the residue of a monoepoxide compound of the general formula (II)

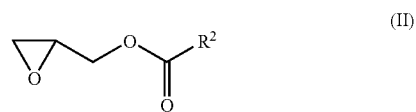

wherein $R^2$ is an alkyl group with 4 to 10 carbon atoms, after reaction with an amine group.

18. The process according to claim 8, further comprising milling the slurry prior to step b) drying the slurry, and wherein water or organic diluent is also stirred in step a) to form the slurry.

19. The process according to claim 18, characterized in that the pigment is an organic pigment provided in the form of a press cake, and in that step b) is carried out by freeze-drying or spray-drying.

20. A process for preparing a pigmented coating composition comprising mixing with stirring in any workable order
   a) the pigment preparation according to claim 7,
   b) at least one film-forming binder, and
   c) at least one liquid diluent.

\* \* \* \* \*